(12) United States Patent
Gao et al.

(10) Patent No.: US 11,785,520 B2
(45) Date of Patent: Oct. 10, 2023

(54) WIRELESS LINK RECOVERY

(71) Applicant: ZTE Corporation, Guangdong (CN)

(72) Inventors: Bo Gao, Guangdong (CN); Zhaohua Lu, Guangdong (CN); Yu Ngok Li, Guangdong (CN); Shujuan Zhang, Guangdong (CN); Ke Yao, Guangdong (CN)

(73) Assignee: ZTE Corporation, Guangdong (CN)

( * ) Notice: Subject to any disclaimer, the term of this patent is extended or adjusted under 35 U.S.C. 154(b) by 186 days.

(21) Appl. No.: 17/370,828

(22) Filed: Jul. 8, 2021

(65) Prior Publication Data

US 2021/0337453 A1 Oct. 28, 2021

Related U.S. Application Data

(63) Continuation of application No. PCT/CN2019/070834, filed on Jan. 8, 2019.

(51) Int. Cl.
*H04W 36/30* (2009.01)
*H04W 76/18* (2018.01)
*H04B 7/06* (2006.01)
*H04W 52/08* (2009.01)
*H04W 52/36* (2009.01)

(52) U.S. Cl.
CPC ........ *H04W 36/305* (2018.08); *H04B 7/0639* (2013.01); *H04W 52/08* (2013.01); *H04W 52/365* (2013.01); *H04W 76/18* (2018.02)

(58) Field of Classification Search
CPC ..... H04W 76/18; H04W 76/19; H04W 36/06; H04W 36/305; H04L 5/001; H04L 5/0051; H04B 7/0639; H04B 7/0695; H04B 7/088
See application file for complete search history.

(56) References Cited

U.S. PATENT DOCUMENTS 10,813,099 B2   10/2020   Zhang et al.
2018/0138962 A1   5/2018   Islam et al.
(Continued)

FOREIGN PATENT DOCUMENTS

CN   108513737 A   9/2018
CN   108810940 A   11/2018
(Continued)

OTHER PUBLICATIONS

Huawei, HiSilicon; "RAN2 aspects of DL beam management"; 3GPP TSG-RAN WG2 Meeting NR#2 Qingdao, China, Jun. 27-29, 2017; R2-1706718 (Year: 2017).*

(Continued)

*Primary Examiner* — Gary Mui
(74) *Attorney, Agent, or Firm* — Perkins Coie LLP

(57) ABSTRACT

A wireless communications method includes acquiring, by a first radio terminal, one or more radio link qualities according to one or more first reference signal (RS) resources. One or more first RS resources are transmitted by a second radio terminal, in a first cell. The method includes determining, by the first radio terminal, a beam failure instance according to the one or more radio link qualities. The method further includes initializing, by the first radio terminal, a recovery request procedure. The recovery request procedure includes at least transmitting, in a case wherein a first condition is met, from the first radio terminal to the second radio terminal in a second cell, a link recovery request message. The first condition includes at least that a number of beam failure instances is equal to or greater than a first threshold value.

22 Claims, 10 Drawing Sheets

(56) References Cited

U.S. PATENT DOCUMENTS

| | | | |
|---|---|---|---|
| 2021/0044344 A1 | 2/2021 | Jiang | |
| 2021/0076372 A1* | 3/2021 | Zhang | H04W 72/044 |
| 2021/0105171 A1 | 4/2021 | Chen et al. | |
| 2021/0204345 A1* | 7/2021 | Shi | H04W 76/15 |
| 2021/0306868 A1* | 9/2021 | Johansson | H04B 7/088 |
| 2021/0320764 A1* | 10/2021 | Gao | H04W 72/044 |
| 2021/0344405 A1* | 11/2021 | Yuan | H04W 72/23 |
| 2021/0385896 A1* | 12/2021 | Kim | H04W 36/0027 |
| 2022/0039077 A1* | 2/2022 | Koskela | H04W 24/10 |

FOREIGN PATENT DOCUMENTS

| | | |
|---|---|---|
| CN | 108882327 A | 11/2018 |
| CN | 109039408 A | 12/2018 |
| RU | 2656339 C2 | 6/2018 |
| WO | 2018/174800 A1 | 9/2018 |
| WO | 2018210176 A1 | 11/2018 |

OTHER PUBLICATIONS

Nokia, Nokia Shanghai Bell; "SCell Beam Failure Recovery"; 3GPP TSG-RAN WG2 Meeting #101bis Sanya, China, Apr. 16-20, 2018; R2-1805342 (Year: 2018).*

European Search Report for EP Patent Application No. 19849179.7, dated Mar. 18, 2022, 16 pages.

Partial European Search Report for EP Patent Application No. 19849179.7, dated Dec. 15, 2021, 18 pages.

Lenovo et al., "Discussion of remaining details of beam failure recovery," 3GPP TSG RAN WG1 Meeting #93, R1-1806354, Busan, Korea, May 21-25, 2018, 3 pages.

Enovo et al., "Discussion of beam failure recovery for carrier aggregation," 3GPP TSG RAN WG1 Meeting #92, R1-1804211, Sanya, China, Apr. 16-20, 2018, 3 pages.

Huawei et al., "Beam failure recovery for Scell," 3GPP TSG RAN WG1 Meeting #95, R1-1813561, Spokane, USA, Nov. 12-16, 2018, 7 pages.

Huawei et al., "Discussion on BFR for SCell," 3GPP TSG RAN WG1 Meeting #94, Gothenburg, Sweden, R1-1809120, 6 pages, Aug. 24, 2018.

International Search Report and Written Opinion dated Aug. 27, 2019 for International Application No. PCT/CN2019/070834, filed on Jan. 8, 2019 (8 pages).

Qualcomm Incorporated, "Enhancements on Multi-beam Operation," 3GPP TSG-RAN WG1 Meeting #94bis, Chengdu, China, R1-1811278, 12 pages, Oct. 12, 2018.

IPO, First Examination Report for Indian Patent Application No. 202147032426, dated Feb. 9, 2023, 6 pages.

KIPO, Office Action for Korean Application No. 10-2021-7024994, dated May 19, 2023, 10 pages with unofficial English translation.

* cited by examiner

WIRELESS LINK RECOVERY

CROSS-REFERENCE TO RELATED APPLICATIONS

This application is a continuation of International Patent Application No. PCT/CN2019/070834, filed on Jan. 8, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity, connectivity, and reliability. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, apparatuses, and computer readable media related to wireless communication, and in particular to a method and apparatus for recovering a lost link between first and second radio terminals.

In one aspect, a method of wireless communication is disclosed. The method includes acquiring, by a first radio terminal, one or more radio link qualities according to one or more first reference signal (RS) resources. One or more first RS resources are transmitted by a second radio terminal, in a first cell. The method includes determining, by the first radio terminal, a beam failure instance according to the one or more radio link qualities. The method further includes initializing, by the first radio terminal, a recovery request procedure. The recovery request procedure includes at least transmitting, in a case wherein a first condition is met, from the first radio terminal to the second radio terminal in a second cell, a link recovery request message. The first condition includes at least that a number of beam failure instances is equal to or greater than a first threshold value.

In another aspect, a wireless communications method is disclosed. The method includes transmitting, by a second radio terminal in a first cell to a first radio terminal, one or more first reference signal (RS) resources; and receiving in a second cell from the first radio terminal, a link recovery request message.

The details of one or more implementations are set forth in the accompanying attachments, the drawings, and the description below. Other features will be apparent from the description and drawings, and from the claims.

DETAILED DESCRIPTION

Figure 1A:
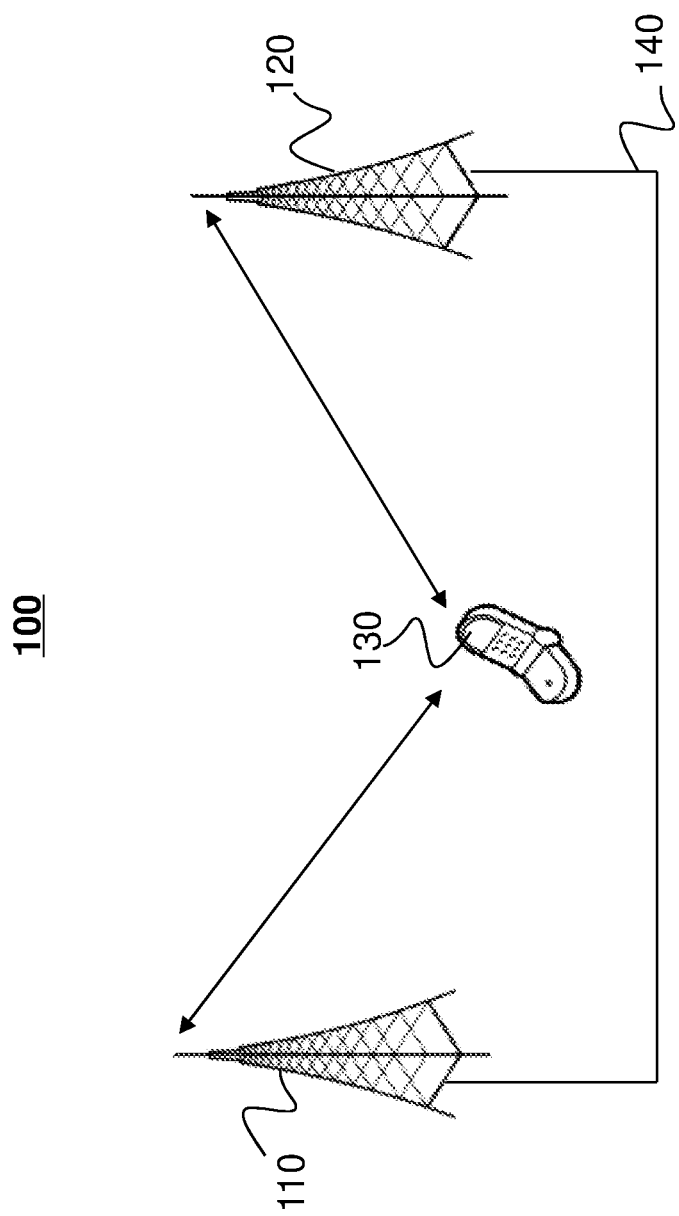
FIG. 1A depicts an example of a system, in accordance with some example embodiments.

Section headings are used in the present document only to improve readability and do not limit scope of the disclosed embodiments and techniques in each section to only that section.

In the 5G new radio (NR) standard, analog beam-forming is introduced into mobile networks in addition to digital beam-forming for guaranteeing the robustness of above 6 GHz high-frequency communications. However, the directional transmission of analog beam-forming limits multipath diversity and makes above 6 GHz communications vulnerable to channel fluctuations, (e.g., communications blockage due to the human body, vehicles, landscaping, and so on). A link recovery procedure, also referred to as a beam recovery procedure, has been adopted for 5G NR, in order to enable a user equipment (UE) to initialize an event-driven reporting of a beam failure and identify a beam for the subsequent data transmission. In NR Release 15, the link recovery procedure comprises of the following four steps: a) beam failure detection, b) new candidate beam identification, c) link recovery request (also called as beam recovery request) from the UE to a next generation node B (gNB), and d) the gNB response for recovery. The procedure can be configured for a primary cell (Pcell) or a primary second cell (PScell), both of which are configured with UL channels for carrying a step-c link recovery request (i.e., PRACH channel).

However, a general second cell (Scell) can be configured for downlink (DL) only (e.g., a Pcell with DL and an UL below 6 GHz, but several Scell(s) with DL only above 6 GHz), which means that, in this case, the link recovery request cannot be carried by the Scell and transmitted to gNB. A link recovery procedure for an Scell may address the following:

1. Procedure and message format of the link recovery request for an S cell using one or more UL channels, which can be in a Pcell or another Scell with UL channels.

2. Procedure and message format of the gNB response for the Scell. Taking into account that the recovery request for Scell may be transmitted in another cell, e.g., Pcell, the gNB response can also occur in the Pcell or be replaced by other related messages (due to the fact that RRC reconfiguration or MAC-CE reactivation commands are still available through the Pcell in such a case).

3. UE behavior for DL channel or UL channel (if any) for the Scell after a gNB response, and the corresponding timeline. The previous quasi-co location (QCL) assumption for the DL channel, or the previous spatial relation and the UL power control configuration for the UL channel (if any) may be out-of-date and some updates may be considered for guaranteeing the subsequent transmission.

As the expense of wide or ultra-wide spectrum, the considerable propagation loss induced by the high frequency propagation, e.g., above 6 GHz, becomes a noticeable challenge. To solve this, antenna array and beam-forming training technologies using massive MIMO, e.g., up to 1024 antenna element for one node, may be adopted to achieve beam alignment and obtain sufficiently high antenna gain. To keep the implementation cost low while still benefitting from the antenna array and associated antenna gain, analog phase shifters may be used to implement mmWave beamforming, which means that the number of phases to be controlled is finite and constant modulus constraints are placed on these antenna elements. Given the pre-specified beam patterns, the variable-phase-shift-based BF training targets to identify the best pattern for subsequent data transmission generally.

FIG. 1A depicts a system 100, in accordance with some example embodiments. System 100 includes a user equipment (UE) 130, a first base station 110 in a primary cell and a second base station 120 in a secondary cell. Each base station may be a next generation node B (gNB), enhanced Node B (eNB) or other base station. When a link between a base station such as base station 110 fails, communications using that link stops. Link recovery is needed to re-establish communications.

Figure 1B:
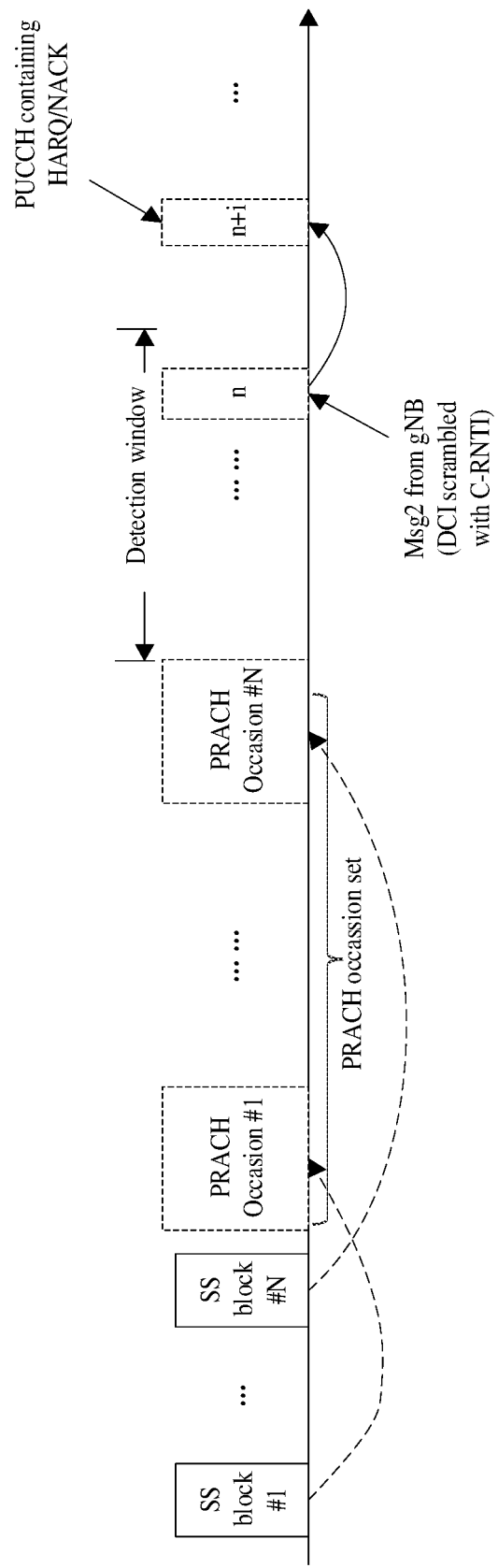
FIG. 1B depicts an example of a contention-free link recovery procedure, in accordance with some example embodiments.

In order to guarantee robustness, the UE can initialize one link recovery procedure in Pcell or PScell, as shown in FIG. 1B, where the link recovery request transmission is based on PRACH. The link recovery procedure can be contention-based or contention-free: the former compared with latter requires the two additional steps after gNB response for recovery, i.e., Msg3 (PUSCH scheduled by RAR UL grant) and Msg 4 (gNB response for the Msg 3), for notifying UE ID (i.e., cell radio network temporary identifier (C-RNTI)) or the purposes of this procedure (e.g., the triggering event is for link recovery) for gNB.

In Pcell or PSCell, the detailed procedure for contention free based link recovery is summarized as follows:

a) Beam failure detection: One or more downlink reference signals (DL RSs) are configured, or implicitly derived, for beam failure detection, and the corresponding block error ratio (BLER) results (as the metric for beam failure detection) are determined through measuring the one or more DL RSs. When the BLER of all or a portion of the DL RSs is not worse than the pre-defined threshold within a configured window, the MAC-CE layer is notified with an indication of link failure instance, which may also be referred to as an indication of beam failure instance or a beam failure instance indication. In the MAC-CE layer, if the indication of link failure instance is received from the PHY layer, the UE shall increment a counter for the beam failure instance or indication, i.e., BFI_COUNTER, by 1, and when the BFI_COUNTER is not less than the pre-configured one threshold, a beam failure event is declared.

b) New candidate beam identification: One or more DL RSs are configured as candidate RSs for a new candidate beam. If the L1-RSRP (reference signal received power) results (as a metric for the new beam) associated with the DL RS is not worse than the pre-defined threshold, the DL RS can be assumed as a new candidate beam, (i.e., q_new).

c) Link recovery request: When a beam failure event is declared and/or at least one new candidate beam is found, the UE shall initialize a PRACH transmission associated with the selected RS q_new from step-b (when the channel quality of any DL RSs as a candidate beam for recovery is all worse than the threshold, any one of DL RS can be selected randomly), where each DL RS for a new beam is associated with one or more PRACH occasions. For example, in FIG. 1B, N SS blocks, also called a SS/PBCH block, are respectively associated with N PRACH occasions.

d) gNB response for recovery: After transmitting a PRACH transmission for a link recovery request, the UE monitors the PDCCH in a dedicated CORESET or a dedicated search space, which may also be referred to as dedicated search space set, for link recovery according to the quasi co-location parameter associated with the DL RS q_new. Once the gNB response is detected, the UE should assume that the gNB response for recovery is received successfully and the corresponding UE behavior, e.g., updating QCL assumption for one or more CORESETs and a spatial filter of PUCCH resources, are performed.

For instance, for the contention-free recovery procedure, one first PDCCH reception in a search space set provided by a recoverySearchSpaceId for detection of a DCI format with a CRC scrambled by C-RNTI or modulation and coding scheme (MCS) C-RNTI is assumed as the gNB response for recovery. After K symbols from a last symbol of the first PDCCH reception, the PUCCH transmission (shown in FIG. 1B) with the same cell as the PRACH is updated to use the same spatial relation/spatial filter as the PRACH transmission in step-c and the pre-defined UL power control parameters or behaviors.

Note that in this patent document a "beam" may be equivalent to a reference signal (RS), a spatial filter, or pre-coding. Specifically, a "Tx beam" may be equivalent to a DL or UL reference signal (such as channel state information reference signal (CSI-RS), synchronization signal block (SSB) (which is also called as SS/PBCH), demodulation reference signal (DMRS), sounding reference signal (SRS)), a Tx spatial filter, or Tx precoding ("Tx" refers to "transmit" or "transmitter"). An "Rx beam" may be equivalent to a spatial filter, an Rx spatial filter, or Rx precoding ("Rx" refers to "receive" or "receiver."). A "beam ID" may be equivalent to reference signal index, a spatial filter index, or a precoding index. Specifically, the spatial filter can be either at the UE-side or gNB-side, and the spatial filter is called as spatial-domain filter.

Note that in this patent document, "spatial relation information" includes one or more reference RSs, which is used to represent a "spatial relation" between a targeted "RS or channel" and the one or more reference RSs, where a "spatial relation" means the same beam(s), same spatial parameter(s), or the same spatial domain filter(s).

Note that in this patent document, "QCL state" is includes one or more reference RSs and their corresponding QCL type parameters, where QCL type parameters include at least one of the following or a combination: [1] Doppler spread, [2] Doppler shift, [3] delay spread, [4] average delay, [5] average gain, and [6] Spatial parameter. In this patent document, a "QCL state" may be equivalent to a transmission configuration indicator (TCI) state.

Note that in this patent document, if there is no special description, a "Pcell" may be equivalent to a primary cell or a primary cell in a corresponding cell group, e.g., PScell.

Note that in this patent document, a link recovery may be equivalent to beam recovery.

Note that in this patent document, a "time unit" may be a sub-symbol, a symbol, a slot, a subframe, a frame, or a transmission occasion.

Example 1

A General Description for Link Recovery Procedure for an Scell

For the link recovery procedure for an Scell, the procedure for the beam failure detection and new beam identification can reuse the current procedure of a Pcell, as mentioned above, regardless of contention based or contention free link recovery.

But, the procedure of a link recovery request and the gNB response can depend on the configuration of the UL channel in the Scell.

If the Scell is configured with the UL channel or PRACH channel, the current procedure for a link recovery request and the gNB response for a Pcell can be reused in the Scell. For example, the parameters for the link recovery procedure for a Pcell or any Scells with an UL can be separately configured by the gNB.

If the Scell is not configured with an UL channel or a PRACH channel, the procedure for a link recovery request may be carried in the Pcell or the Scell with the UL of the cell group associated with the Scell. The link recovery request can be transmitted in the Pcell or Scell with the UL, considering that the UL channel (e.g., PUCCH, MAC-CE and PRACH), of the Pcell is still available. In this case for Scell link recovery, new approaches for the link recovery request, the gNB response for the link recovery and the UE default behavior after the gNB response can be found in Examples 3~6 below, taking into account that the corresponding link recovery request occurs in a different cell.

Note that in the case of an Scell with DL and UL, a beam recovery request can also be transmitted by the Pcell, in order to unify the design for the Scell link recovery procedure. Some more details for the UE behavior for those UL signals in the Scell after detecting the gNB response can be found in Example 5 below.

Example 2

Link Recovery Request for an Scell

When a beam failure is declared, or a new candidate beam is found, the UE initializes at least one or a combination of the following for a link recovery request transmission:
1. Dedicated signaling for recovery in PUCCH or PUSCH;
2. Scheduling request (SR);
3. Random access;
4. Multiplexing and assembly procedure;
5. MAC-CE command for recovery, which at least contains link recovery request information; or
6. CSI reporting, which at least contains link recovery request information. CSI reporting is periodic or semi-persistent CSI reporting.

A "beam failure event is declared" when an indicator including a counter for the quantity of beam failure instances reaches or exceeds a threshold value. Furthermore, one or more downlink reference signals (DL RSs) are configured, or implicitly derived, for beam failure detection, and the corresponding block error ratio (BLER) results (as the metric for beam failure detection) may be determined through measuring the one or more DL RSs. A beam failure instance is determined or declared when the BLER of all or a portion of the DL RSs is not worse than a pre-defined threshold within a window.

For example, a "new candidate beam is found" when the channel quality of one DL RS is higher than or equal to a first threshold for channel quality metrics including RSRP or SINR. In another example, a "new candidate beam is found" when the channel quality of the DL RS is less than or equal to a second threshold for channel quality metrics including BER or BLER.

For a link recovery request transmission, at least one of the following features is present:

1. A SR transmission occasion (or group) is associated with a cell ID, a cell group ID, a DL RS resource or a DL RS resource group, where the DL RS is used for identifying the new candidate beam. The SR transmission occasion is dedicated to Scell beam failure recovery.

2. A transmission occasion of PUCCH, PUSCH, SR or dedicated signaling for recovery, or resource (group) of PUCCH or PUSCH is associated with a cell ID, a cell group ID, a DL RS resource or a DL RS resource group, where the DL RS is used for identifying new candidate beam(s). Further, PUCCH is periodic PUCCH or semi-persistent PUCCH. PUSCH is semi-persistent scheduling (SPS) PUSCH. Further, the resource (group) of PUCCH or PUSCH carries SR or dedicated signaling for recovery.

3) Link recovery request information (or, the dedicated signaling for recovery) is jointly coded with scheduling request (SR) information or carried by SR signaling. For example, one PUCCH resource can contain 2-bits.

2'b00 means no further information;
2'b01 means SR signaling for Pcell;
2'b10 means link recovery request for Scell-i or Scell group-i;
2'b11 means link recovery request for Scell-j or Scell group-j.

Further, the link recovery request information comprises of at least one of: a cell ID, a cell group ID, a DL RS resource, a DL RS resource group. Further, the DL RS resource or DL RS resource group is used for identifying a new candidate beam.

DL or UL RS resource groups can be associated with the SR, or, from the perspective of the UE, the reception or transmission of DL or UL RS resource groups are triggered or activated by the SR, the random access, the MAC-CE command for recovery, or the CSI reporting.

After one of the following conditions is met, the UE shall receive a DL RS associated with the corresponding resource set, or transmit UL resources in the UL RS resource set.

1. Detecting response for link recovery;
2. Transmitting PUSCH or PUCCH, which carries the SR, the random access, the MAC-CE for recovery, or the CSI reporting;

3. Detecting indication for new data for PUSCH, which carries the SR, the random access, the MAC-CE for recovery, or the CSI reporting; or 4. Beam correspondence is NOT supported by the UE.

Further, the DL RS resources may be configured with a repetition parameter. Further, the UL RS resources may be configured with the usage of beam management.

Further, the MAC-CE command for recovery in the MAC may be prioritized over at least one of the following channels:

1. Configured Grant Confirmation MAC CE;
2. MAC CE for BSR, with exception of BSR included for padding;
3. Single Entry PHR MAC CE or Multiple Entry PHR MAC CE;
4. Data from any logical channel, except data from UL-CCCH;
5. MAC CE for Recommended bit rate query; or
6. MAC CE for BSR included for padding.

Further, the MAC-CE command for recovery may be de-prioritized over at least one of the following channels:

1. C-RNTI MAC CE or data from UL-CCCH;
2. Configured Grant Confirmation MAC CE;
3. MAC CE for BSR, with exception of BSR included for padding;

A hybrid procedure of SR/dedicated signaling for the recovery request and the MAC-CE can be used for providing one beam recovery request.

Figure 3:
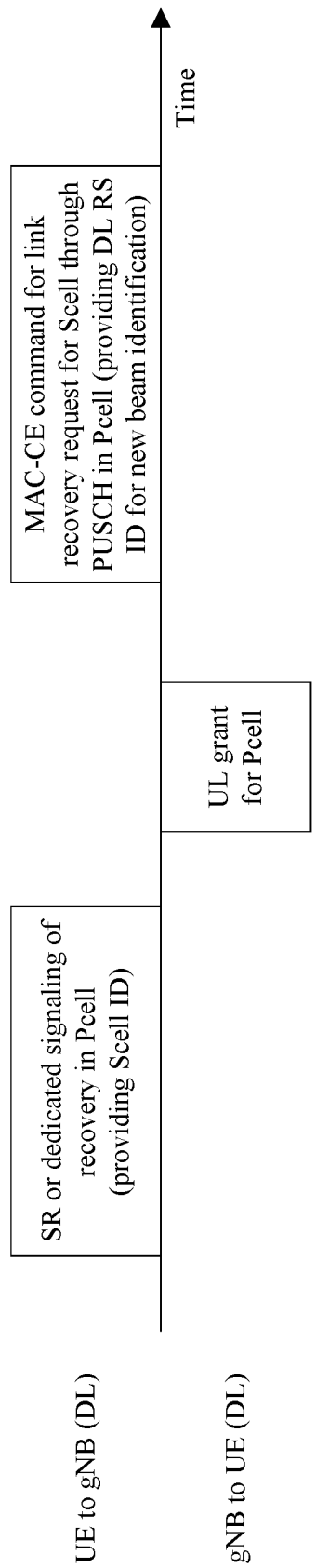
FIG. 3 depicts an example of a hybrid procedure of SR/dedicated signaling for a recovery request and a medium access control (MAC) control element (MAC-CE) to be used for providing a beam recovery request, in accordance with some example embodiments.

One transmission occasion group of SR or dedicated signaling for a recovery request may be associated with a Scell ID, and the MAC-CE command for recovery scheduled by an SR from the group may be to provide the new candidate beam for the Scell which is shown in FIG. 3.

Further, the recovery request information of the MAC-CE command may be determined according to its associated SR/dedicated signaling, where the SR transmission occasion/dedicated signaling for recovery request is associated with a cell group ID, or a DL RS resource group. The recovery request information indicates a cell of the cell group associated with the SR/dedicated signaling or one resource of DL RS resource group.

Furthermore, a hybrid procedure of SR/dedicated signaling for a recovery request and ap-CSI reporting can be used for providing a beam recovery request.

Figure 4A:
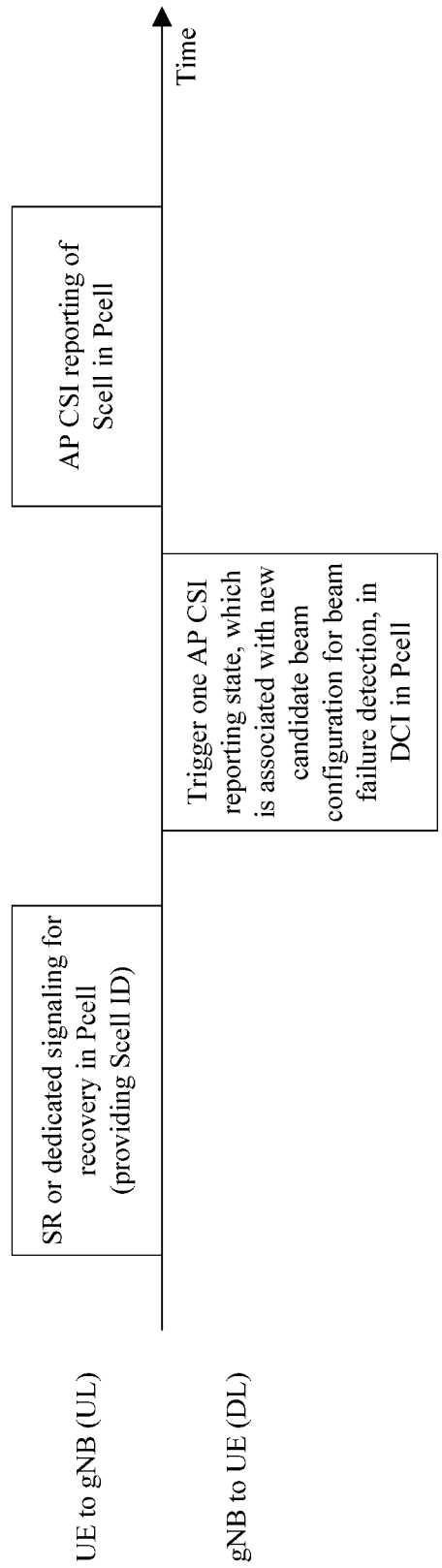
FIG. 4A depicts an example of depicts a hybrid procedure of scheduling request (SR)/dedicated signaling for recovery and AP channel state information (CSI) reporting used for providing a beam recovery request, in accordance with some example embodiments.

A transmission occasion group of SR or dedicated signaling for recovery is associated with a Scell ID, and the ap-CSI reporting triggered by the gNB provides the new candidate beam index of the Scell, as shown in FIG. 4A. The DL RS resources used for a new candidate beam identification is associated with a dedicated trigger state of ap-CSI reporting. The ap-CSI reporting of Scell is carried by Pcell PUSCH.

Figure 4B:
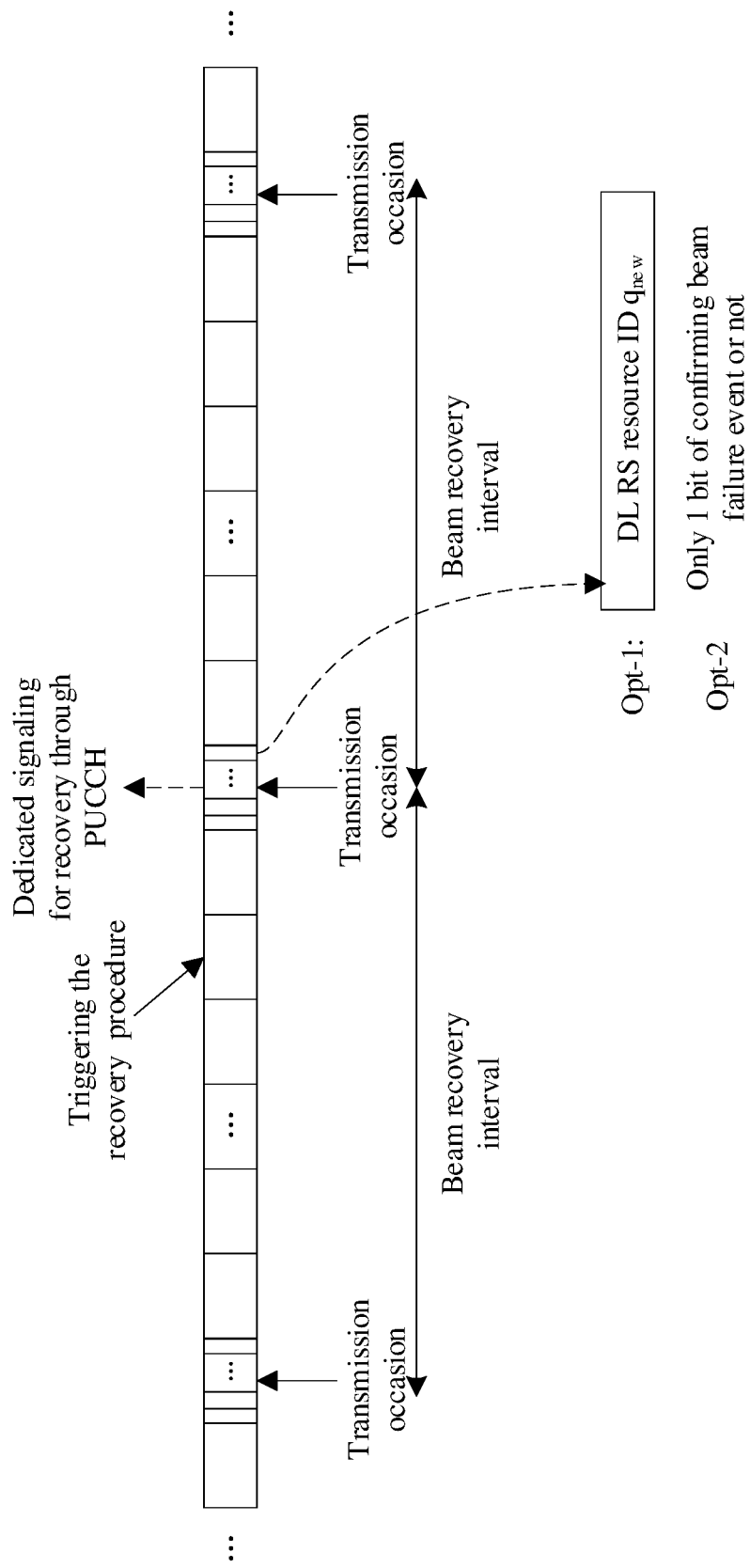
FIG. 4B depicts an example of a PUCCH based recovery request procedure, in accordance with some example embodiments.

Dedicated signaling for recovery which may be referred to as dedicated recovery request information, can be multiplexed with a SR, and/or can be introduced for reporting request signaling of beam failure recovery in PUCCH. An Scell ID and/or new candidate beam ID can be associated with transmission occasions of the dedicated signaling for recovery as shown in FIG. 4B. The transmission occasion of the dedicated signaling for recovery is only associated with the Scell ID, and then the dedicated signaling can provide the new candidate beam ID explicitly. Furthermore, the transmission occasion of the dedicated signaling for recovery may only be associated with the Scell ID, and the dedicated signaling only occupies one bit for confirming whether a beam failure event occurs in SCell or not. Once receiving the dedicated signaling of reporting beam failure event, the gNB can trigger one AP-CSI reporting for obtaining the new candidate beam ID, i.e., the index of DL RS q_new.

Example 3

The gNB Response Approach for Scell and the UE Behavior Due to Detecting the gNB Response After or from the link recovery request transmission, the UE may perform at least one of the following:

1. Detecting the dedicated CORESET or search space for recovery in the Scell. Monitoring the dedicated CORESET or search space for recovery in Scell is S time units after transmitting beam recovery request, where S is integer. From the perspective of the gNB, the PDCCH in the dedicated CORESET or search space is transmitted S time units after receiving beam recovery request. Further, S time units are determined according to numerologies associated with the channel associated with link recovery request, the gNB response, or the CORESET in the Scell. Further, the first unit of the S time units is from a first type of time units of the Scell which is not earlier or later than a second type of unit of channel carrying the link recovery request. For example, the first time point for counting is the first symbol of Scell, which is not earlier or later than the last symbol of the channel carrying the link recovery request.

2. Detecting the dedicated CORESET or search space for recovery in Pcell.

3. Receiving one MAC-CE command of confirming beam recovery request.

4. A DCI codepoint, a MAC-CE codepoint or an RRC parameter entry for a QCL state is overwritten by, or associated with, the DL RS q_new carried by link recovery request information;

The MAC-CE or RRC parameter for the QCL state may be associated with one or more CORESETs of the Scell. For example, one entry of a QCL state pool for one or more CORESET of Scell may be associated with the latest DL RS, which at least is the RS carried by link recovery request information. Subsequently, once receiving the link recovery request for the UE, the gNB can activate the RRC entry for the CORESET as beam re-indication. For example, one codepoint of a MAC-CE activation or deactivation signaling for QCL may be reserved to be associated with the latest DL RS, which at least is the RS carried by link recovery request information. Subsequently, one receiving the link recovery request from the UE, the gNB can activate the codepoint for the CORESET as beam re-indication. Further, the codepoint can be any of first type codepoints, if the QCL state associated with the first type codepoint has not been configured or not been available yet.

Also, at least one of the following signaling is seen as gNB response for recovery request.

1. A PDCCH or DCI format in dedicated CORESET or search space for recovery in the Scell. Furthermore, the PDCCH or DCI format is CRC scrambled by C-RNTI or MCS-C-RNTI.

2. A PDCCH or DCI format in dedicated CORESET or search space for recovery in the Pcell. Furthermore, the PDCCH or DCI format is CRC scrambled by C-RNTI or MCS-C-RNTI.

3. A MAC command of confirming beam recovery request (which may also be referred to a MAC-CE command of confirming beam recovery request).

4. A RRC re-configuration of a QCL state for a CORESET in the Scell, or spatial relation for a PUCCH resource in the Scell.

5. A MAC re-activation command of a QCL state for a CORESET in the Scell, or spatial relation for a PUCCH resource in the Scell.

Example 4

UE Behavior for Scell DL Signal after Detecting a gNB Response

After one of the following occurs, or K time units (where K is integer) after one of the following occurs, a PDCCH in the dedicated CORESET or a search space for recovery, or one or more CORESETs in the Scell is monitored according to the QCL assumption of the DL RS in the beam failure recovery request until the QCL state for the CORESET is re-configured or re-activated.

Figure 5:
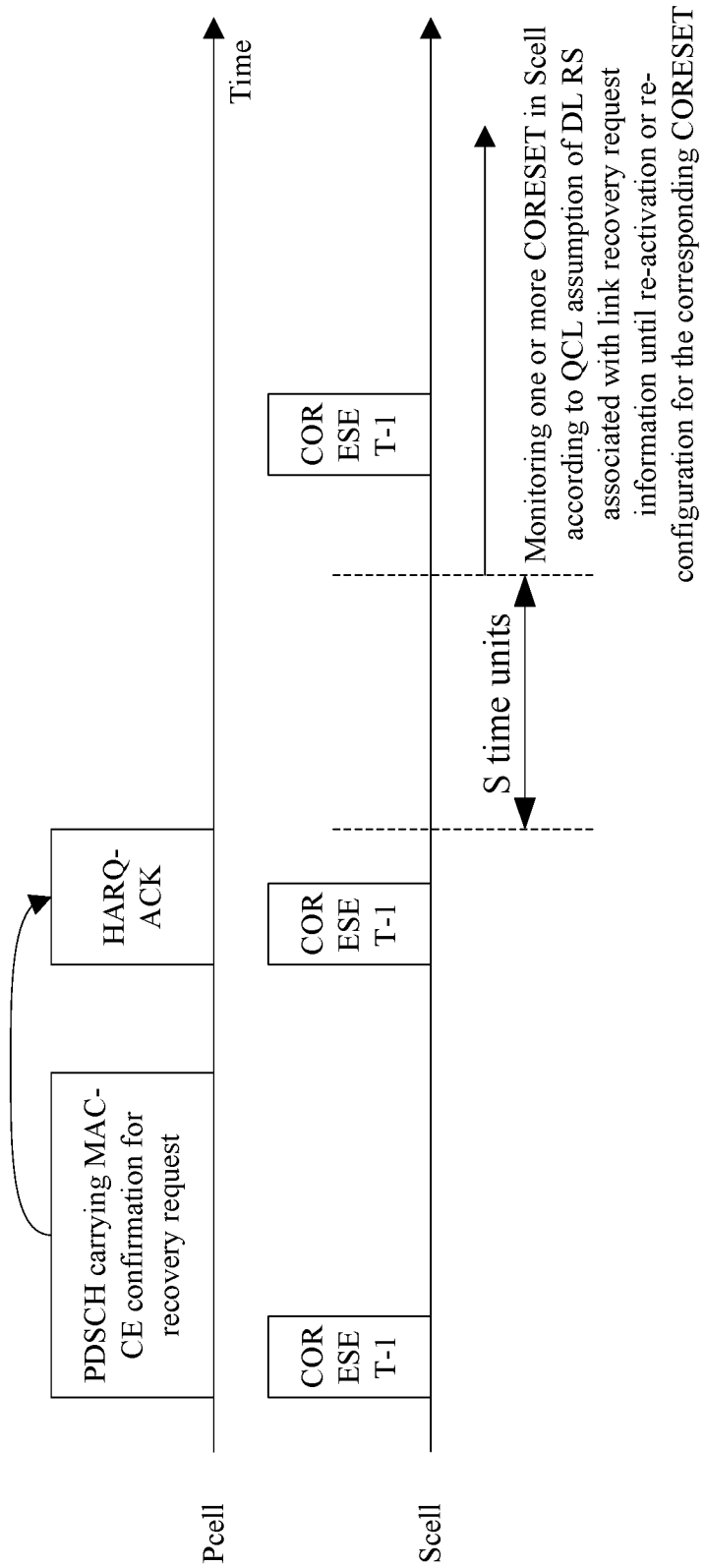
FIG. 5 depicts an example of a quasi co-location (QCL) assumption for control resource sets (CORESETs) in an Scell after a next generation Node B (gNB) response using MAC-CE confirmation signaling, in accordance with some example embodiments.

1. Transmitting a link recovery request as described in Example 2 above;
2. Detecting a gNB response for recovery request as described in Example 3 above;
3. Detecting an indication for new data for PUSCH, which carries the SR, the random access, the MAC-CE for recovery, or the CSI reporting;
4. HARQ-ACK corresponding to the PDSCH carrying the MAC command of confirming link recovery request. Further, S time units are determined according to numerologies associated with channel associated with the link recovery request, the gNB response or the CORESET in the Scell. Further, the time point for counting is the first time unit of Scell, which is not earlier or later than last symbol of the channel carrying the link recovery request or the gNB response for recovery. One example for this case is shown in in FIG. 5.

Further, the one or more CORESETs should be associated with at least one common search space (CSS) or CORESET#0.

Example 5

UE Behavior for Scell UL Signal after Detecting a gNB Response

Figure 2:
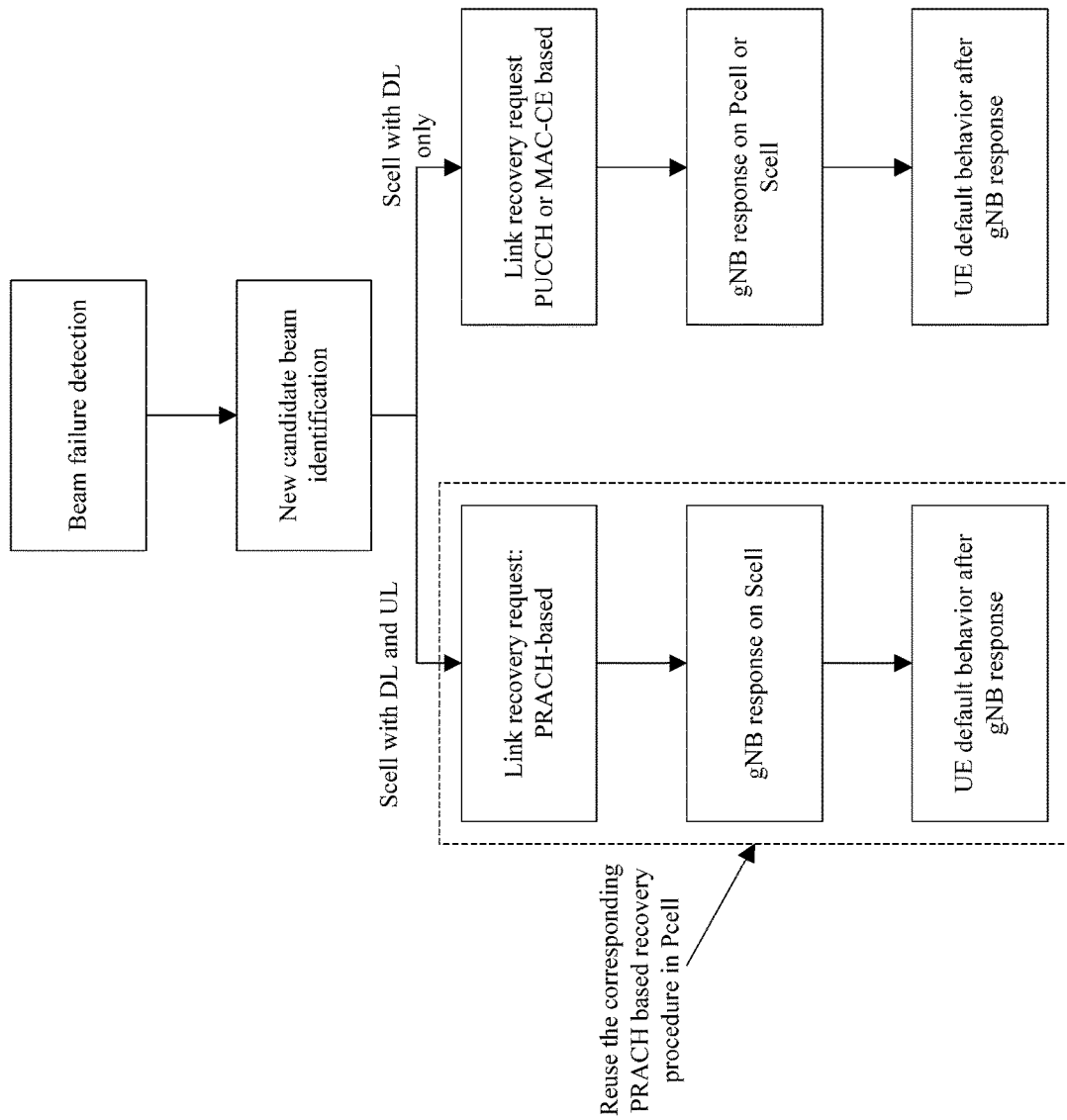
FIG. 2 depicts an example of a link recovery procedure for a secondary cell (Scell) with a downlink (DL) and an uplink (UL), and an Scell with DL only, in accordance with some example embodiments.

In the case of Scell with UL and DL, as shown in FIG. 2, the procedure of PRACH based beam recovery request, dedicated CORESET or search space of the gNB response in Scell and updating the QCL assumption or spatial filter of DL or UL channel can be performed.

Further, the above procedure can be performed if the UE does not support the beam correspondence.

On the other hand, the beam recovery request of the Scell can also be transmitted by Pcell, in order to unify the design for Scell regardless of the scenarios of DL only or both DL and UL. Therefore, for the Scell with UL and DL, UL beam management may be used for selecting a new UL beam for UL transmission, and until re-activation or re-configuration of a spatial relation for the PUCCH resource in the Scell, the PUCCH in response to PDSCH in the Scell may be transmitted in Pcell.

After transmitting a link recovery request, detecting the gNB response for the recovery request, or HARQ-ACK corresponding to the PDSCH carrying the MAC-CE command of confirming the link recovery request, the UL channel (which can be PUSCH, PUCCH or SRS) may be transmitting according to at least one of the following:

a) Spatial relation or spatial filter may be determined according to the DL RS to be associated with the link recovery request. Furthermore, the spatial filter of UL channel may be the same as the spatial filter of the DL RS reception.

b) A target power associated with the UL channel is a target power indicated by a specific index in a target power set, or the target power is 0.

c) A reference signal of a path loss estimation associated with the UL channel is a downlink reference signal with index q_new provided by a higher layer, or DL RS to be associated with the link recovery request;

d) A closed loop power control of the UL channel:
(1) has a specific index; or
(2) is a pump-up value associated with the random access preamble, or a pump-up value associated with the random access preamble plus the value indicated by transmission power command (TPC) in one downlink control information; or
(3) is the value for one SRS. Furthermore, the SRS is SRS resource set, the usage of which is beam management; or
(4) is reset.

Further, the above behavior is performed if at least one of the following condition is met.

1. Beam correspondence is supported by the UE.
2. Partial beam correspondence is support by the UE Further, the specific index can be 0, a lowest index, or a highest index.

Further, the MAC-CE command for the link recovery request can be associated with or activates one or more SRS resource set, the usage of which is beam management.

Further, the spatial relation or spatial filter of the SRS should be determined according to the DL RS to be associated with the link recovery request.

Besides, the spatial filter of SRS may be the same spatial filter as or quasi-co spatial filter(s) as the DL RS reception.

Example 6

QCL Assumption for Monitoring CORESET after Detecting gNB Response

After detecting the gNB response, the PDCCH in the following CORESETs should be monitored or prioritized to be monitored according to the QCL as DL RS $q_{new}$.

One or more CORESETs or CORESETs with CSS, if only one active TCI state is supported by UE. Further, the CORESETs or the CORESETs with CSS are in the same cell or BWP as the PRACH transmission for recovery or the link failure detection.

CORESETs with lowest or highest X−N or X−N+1 CORESET ID or CORESETs associated with lowest or highest N or N−1 active QCL state IDs, if N>1 active QCL states is supported by UE, where X is the number of CORESETs, or the number of CORESETs excluding the dedicated CORESET for link recovery. Further, the lowest N CORESETs or CORSETs associated with the lower N active TCI IDs exclude the CORESET BFR and CORESET#0.

CORESET#0—If the CORESET#0 is in the BWP or cell, only SSB can be configured for new candidate beam identification, i.e., in higher layer parameter candidateBeamRSList; or, if the CORESET#0 is in the BWP or cell, only SSB or CSI-RS, the reference or source RS of QCL state associated with which is SSB, can be configured for new candidate beam identification. Further, the BWP or cell is the same BWP or cell as the PRACH for recovery or the link failure detection.

Figure 6:
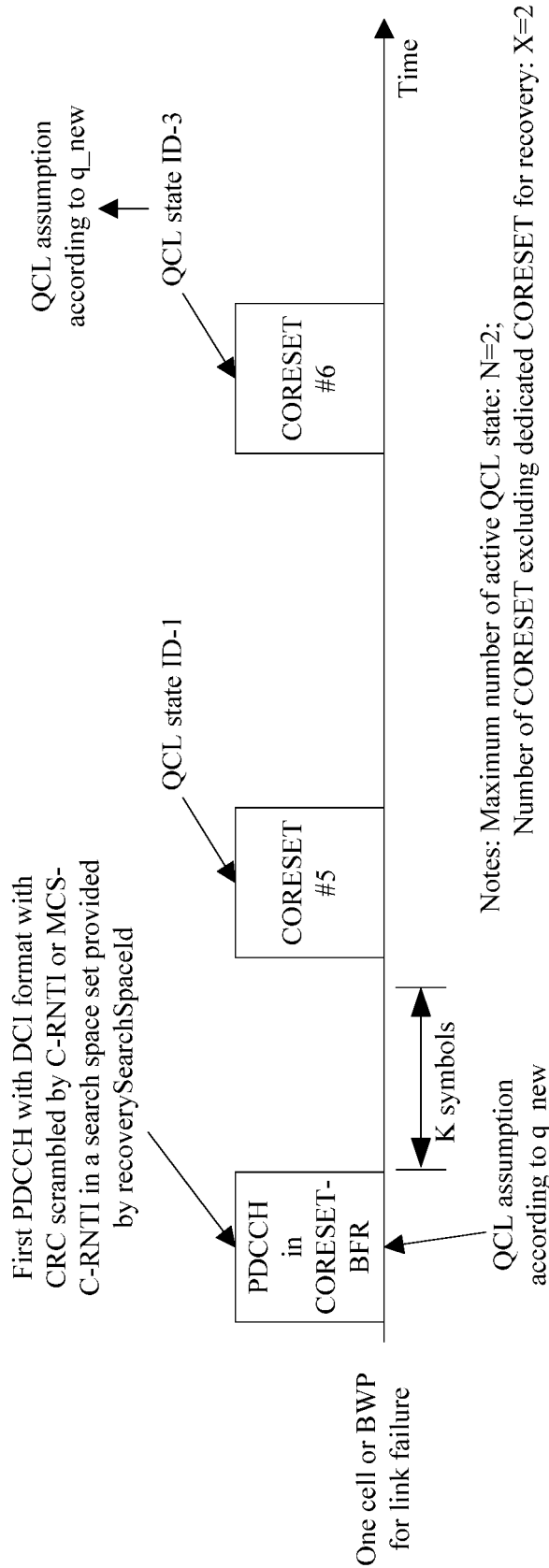
FIG. 6 depicts UE behavior of QCL assumption for monitoring CORESET after detecting a gNB response, in accordance with some example embodiments.

For example, as shown in FIG. 6, excluding dedicated CORESET for link recovery, also called as CORESET-BFR, the number of CORESETs X=2 and, as UE capability, the maximum number of active QCL state N=2. Once receiving gNB response for link recovery, i.e., detecting the first PDCCH with DCI format with CRC scrambled by C-RNTI or MCS-C-RNTI in a dedicated search space set for link recovery, i.e., provided by recoverySearchSpaceId, CORESETs associated with highest N−1=1 active QCL state IDs should be monitored according to the QCL as DL RS $q_{new}$. Consequently, the CORESET#6 with QCL state ID-3 should be monitored according to the QCL assumption according to DL RS associated with $q_{new}$. Note that the QCL state for the CORESET#5, i.e., QCL state ID-1, may still remain.

SUMMARY

A) When beam failure event is declared or a new candidate beam is found, the UE initializes at least one or combination of the following for a link recovery request transmission:
  a) Dedicated signaling for recovery in PUCCH or PUSCH
  b) Scheduling request (SR)
  c) Random access
  d) Multiplexing and assembly procedure
  e) MAC-CE command for recovery, which at least contains link recovery request information.
  f) CSI reporting, which at least contains link recovery request information. The CSI reporting may be periodic or semi-persistent CSI reporting. The DL RS resources used for the new candidate beam identification is associated with a dedicated trigger state of ap-CSI reporting.

A "beam failure event is declared" when the counter for beam failures reaches or exceeds one threshold quantity.

For example, a "new candidate beam is found" when the channel quality of a DL RS is higher than or equal to a first threshold for channel quality metrics including RSRP and/or SINR. In another example, a "new candidate beam is found" when the channel quality of one DL RS is less than or equal to a second threshold for channel quality including BER and/or BLER.

Furthermore, for link recovery request transmission, there is at least one of the following features:
  a) An SR transmission occasion (or a group) is associated with a cell ID, a cell group ID, a DL RS resource or a DL RS resource group, where the DL RS is used for identifying a new candidate beam. The SR transmission occasion is dedicated to an Scell beam failure recovery.
  b) A transmission occasion of PUCCH, PUSCH, SR or dedicated recovery signaling, or resource (group) of PUCCH or PUSCH is associated with a cell ID, a cell group ID, a DL RS resource or a DL RS resource group, where the DL RS is used for identifying new candidate beam(s). Further, the PUCCH may be periodic PUCCH or semi-persistent PUCCH. The PUSCH may be semi-persistent scheduling (SPS) PUSCH. Further, the resource (group) of PUCCH or PUSCH may carry SR or dedicated recovery signaling.
  c) Link recovery request information (or, the dedicated recovery signaling) is joint coded with scheduling request (SR) information or carried by SR signaling. Further, the link recovery request information includes at least one of: a cell ID, a cell group ID, a DL RS resource, or a DL RS resource group. Further, the DL RS resource or DL RS resource group may be used for identifying new candidate beam. DL or UL RS resource groups can be associated with the SR. The reception or transmission of DL or UL RS resource groups may be triggered or activated by the SR, the random access, the MAC-CE command for recovery, or the CSI reporting.

After one of the following condition is met, the UE receives DL RS associated with the corresponding resource set or transmit UL resources in the UL RS resource set.
  1) Detecting a response for link recovery;
  2) Transmitting a PUSCH or PUCCH which carries the SR, the random access, the MAC-CE for recovery, or the CSI reporting;
  3) Detecting an indication for new data for PUSCH, which carries the SR, the random access, the MAC-CE for recovery, or the CSI reporting;
  4) A beam correspondence is NOT support by the UE.

Further, the DL RS resources may be configured with a repetition parameter. Further, the UL RS resources should be configured with usage of beam management.

Further, the MAC-CE command for recovery in MAC shall be prioritized over at least one of the following channels:
  1) Configured Grant Confirmation MAC CE;
  2) MAC CE for BSR, with exception of BSR included for padding;
  3) Single entry PHR MAC CE or multiple entry PHR MAC CE;
  4) Data from any logical channel, except data from UL-CCCH;
  5) MAC CE for recommended bit rate query;
  6) MAC CE for BSR included for padding.

Further, the MAC-CE command for recovery shall be de-prioritized over at least one of the following channels:
  1) C-RNTI MAC CE or data from UL-CCCH;
  2) Configured Grant Confirmation MAC CE;
  3) MAC CE for BSR, with exception of BSR included for padding.

Further, the recovery request information of the MAC-CE command may be determined according to its associated SR/dedicated signaling, where SR transmission occasion/dedicated signaling for recovery request is associated with one cell group ID, or one DL RS resource group. Further, the recovery request information may indicate a cell of the cell group associated with the SR/dedicated signaling or a resource of DL RS resource group.

B) After or from the link recovery request transmission, UE should perform at least one of the following behavior.
  1) Detecting the dedicated CORESET or search space for recovery in Scell. Monitoring the dedicated CORESET or search space for recovery in Scell is S time units after transmitting beam recovery request. Further, S time units are determined according to numerologies associated with channel associated with link recovery request, gNB response or CORESET in the Scell. Further, the first unit of S time units is from one first type time unit of Scell which is not earlier or later than last second type unit of channel carrying the link recovery request. For example, the first time point for counting is the first symbol of Scell, which is not earlier or later than the last symbol of channel carrying the link recovery request.
  2) Detecting the dedicated CORESET or search space for recovery in Pcell
  3) Receiving one MAC command of confirming beam recovery request 4) A DCI codepoint, a MAC-CE codepoint or an RRC parameter entry for a QCL state is overwritten by or associated with the DL RS q_new carried by link recovery request information. Further, the codepoint or parameter entry can be one of first type codepoints or parameter entries, if the first type codepoints or parameter entries are NOT configured with QCL state.

C) After one of the following occurs, or K time units after one of the following occurs, PDCCH in the dedicated CORESET or a search space for recovery, or one or more CORESETs in the Scell is monitored according to the QCL assumption of the DL RS in a beam failure recovery request until the QCL state for the CORESET is re-configured or re-activated.

1) Transmitting link recovery request as described in Embodiment #2
2) Detecting gNB response for recovery request as described in Embodiment #3;
3) Detecting indication for new data for PUSCH, which carries the SR, the random access, the MAC-CE for recovery, or the CSI reporting;
4) HARQ-ACK corresponding to the PDSCH carrying the MAC-CE command of confirming link recovery request. Further, S time units are determined according to numerologies associated with channel associated with link recovery request, gNB response or CORESET in the Scell. Further, the time point for counting is the first time unit of Scell, which is not earlier or later than last symbol of channel carrying the link recovery request or gNB response for recovery.

Further, the one or more CORESETs should be associated with at least one common search space (CSS) or CORESET#0.

D) After transmitting link recovery request, detecting gNB response for recovery request, or HARQ-ACK corresponding to the PDSCH carrying the MAC-CE command of confirming link recovery request, the UL channel (which can be PUSCH, PUCCH or SRS) should be transmitting according to at least one of the following:

a) Spatial relation or spatial filter should be determined according to the DL RS to be associated with the link recovery request. Furthermore, the spatial filter of UL channel should be the same as the spatial filter of the DL RS reception.
b) A target power associated with the UL channel is a target power indicated by a specific index in a target power set, or the target power is 0.
c) A reference signal of a path loss estimation associated with the UL channel is a downlink reference signal with index q_new provided by a higher layer, or DL RS to be associated with the link recovery request;
d) A closed loop power control of the UL channel:
1) has a specific index; or
2) is a pump-up value associated with the random access preamble, or a pump-up value associated with the random access preamble plus the value indicated by transmission power command (TPC) in one downlink control information; or
3) is the value for one SRS; or
Furthermore, the SRS is SRS resource set, the usage of which is beam management.
4) is reset.
Further, the above behavior is performed if at least one of the following condition is met.
1) Beam correspondence is supported by the UE.
2) Partial beam correspondence is support by the UE Further, the specific index can be 0, a lowest index, or a highest index.

E) MAC-CE command for recovery can be associated with or activates one or more SRS resource set, the usage of which is beam management. Further, the spatial relation or spatial filter of SRS should be determined according to the DL RS to be associated with the link recovery request. Besides, the spatial filter of SRS should be the same spatial filter as or quasi-co spatial filter(s) as the DL RS reception.

F) After detecting gNB response, PDCCH in the following CORESETs should be monitored or prioritized to be monitored according to the QCL as DL RS $q_{new}$. As used herein, $q_{new}$ may also be referred to as q_new.

1) One or more CORESETs or CORESETs with CSS, if only one active TCI state is supported by UE. Further, the CORESETs or the CORESETs with CSS are in the same cell or BWP as the PRACH transmission for recovery or the link failure detection.
2) CORESETs with lowest or highest X-N or X-N+1 ID or CORESETs associated with lowest or highest N or N-1 active QCL state IDs, if N>1 active QCL states is supported by UE, where X is the number of CORESETs, or the number of CORESETs excluding the dedicated CORESET for link recovery. Further, the lowest N CORESETs or CORSETs associated with the lower N active TCI IDs exclude the CORESET BFR and CORESET#0.
3) CORESET#0

G) If the CORESET#0 or CORESET with CSS is in the BWP or cell, only SSB can be configured for new candidate beam identification, i.e., in higher layer parameter candidateBeamRSList; or, if the CORESET#0 is in the BWP or cell, only SSB or CSI-RS, the reference or source RS of QCL state associated with which is SSB, can be configured for new candidate beam identification. Further, the BWP or cell is the same BWP or cell as the PRACH for recovery or the link failure detection.

Figure 7:
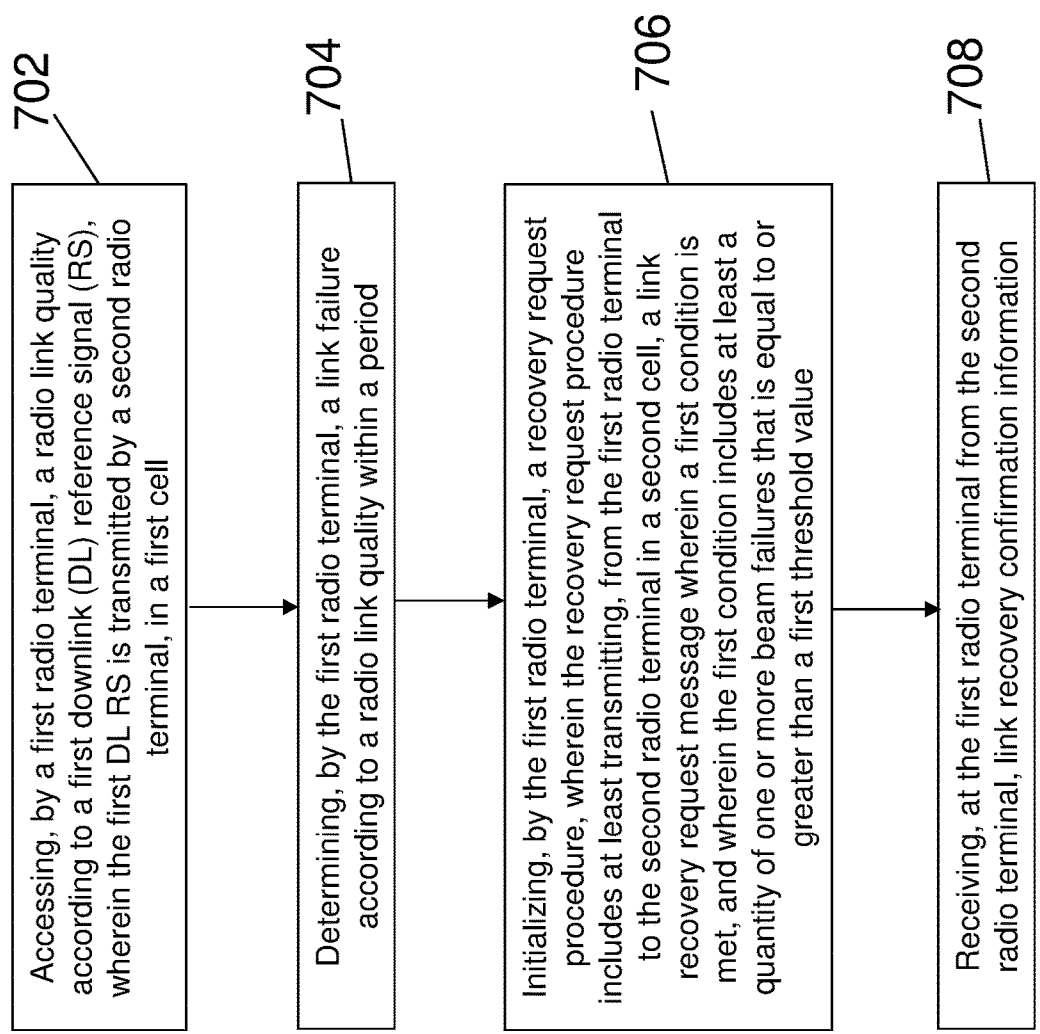
FIG. 7 depicts an example of a process, in accordance with some example embodiments.

FIG. 7 depicts a process, in accordance with some example embodiments. The process includes a method of wireless communication. At 702, the method includes accessing, by a first radio terminal, a radio link quality according to a first downlink (DL) reference signal (RS), wherein the first DL RS is transmitted by a second radio terminal, in a first cell. At 704, the method includes determining, by the first radio terminal, a link failure according to a radio link quality within a period. At 706, the method includes initializing, by the first radio terminal, a recovery request procedure. The recovery request procedure includes at least transmitting, from the first radio terminal to the second radio terminal in a second cell, a link recovery request message wherein a first condition is met. The first condition includes at least a quantity of one or more beam failures that is equal to or greater than a first threshold value. At 708, the method includes receiving, at the first radio terminal from the second radio terminal, link recovery confirmation information.

The following examples are not intended to be limiting. Although specific communications equipment is listed, other equipment may be used in their place. In some example embodiments, the second radio terminal is a base station such as an enhanced node B (eNB) or a next generation node B (gNB) or another base station. The first radio terminal may be a user equipment, mobile terminal, handset, smartphone, cell phone, or other mobile device.

Figure 8:
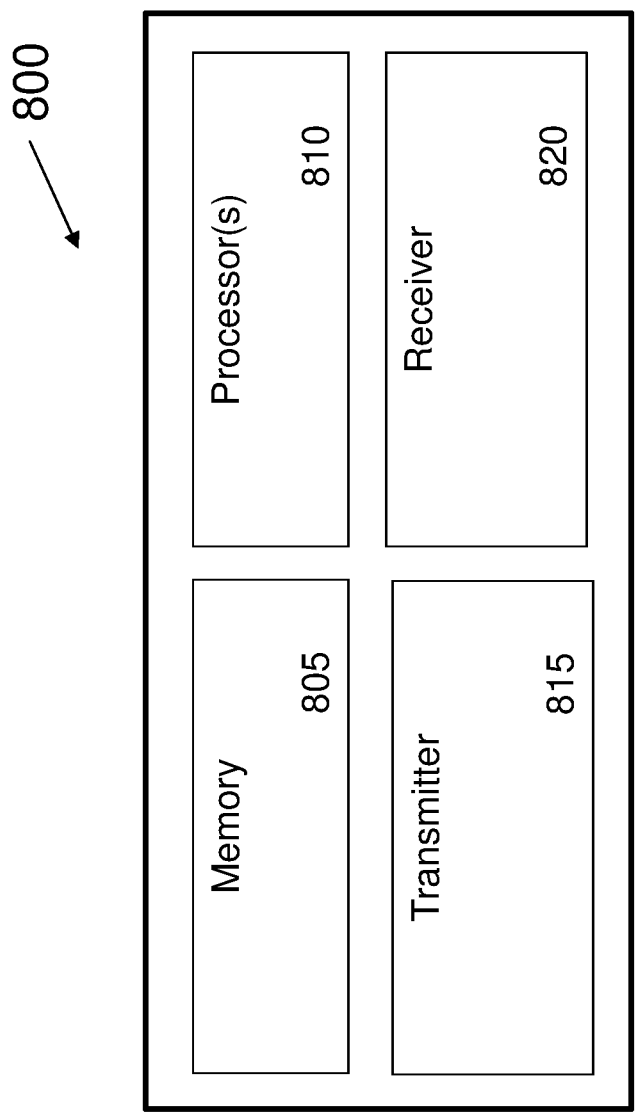
FIG. 8 depicts an apparatus, in accordance with some example embodiments.

FIG. 8 depicts a block diagram 800 representing of a portion of a radio station. A radio station 800 such as a base station or a wireless device (or UE) can include one or more processors 810 such as a microprocessor that implements one or more of the wireless techniques presented in this document. The radio station 800 can include transmitter electronics 815 to send and receive electronics 820 to receive wireless signals over one or more communication interfaces such as an antenna. The radio station 800 can include other communication interfaces for transmitting and receiving data. Radio station 800 can include one or more memories 805 configured to store information such as data and/or instructions. In some implementations, the processor electronics 810 can include at least a portion of the transceiver electronics 820/815. In some embodiments, at least some of the disclosed techniques, modules or functions are implemented using the radio station 800.

In one aspect a wireless communications method is disclosed. The method includes acquiring, by a first radio terminal, one or more radio link qualities according to one or more first reference signal (RS), wherein one or more first RS resources are transmitted by a second radio terminal, in a first cell; determining, by the first radio terminal, a beam failure instance according to the one or more radio link qualities; and initializing, by the first radio terminal, a recovery request procedure, wherein the recovery request procedure includes at least transmitting, in a case wherein a first condition is met, from the first radio terminal to the second radio terminal in a second cell, a link recovery request message, wherein the first condition includes at least that a number of beam failure instances is equal to or greater than a first threshold value. In some example embodiments, when first the condition is not met, the link recovery request message is not transmitted.

The following features may be included in various combinations. The recovery request procedure may include one or more of: a new candidate beam identification; a scheduling request (SR); a random access procedure; a multiplexing and assembly procedure; or a channel state information (CSI) report. The link recovery request message may be signaled by at least one of: a random access preamble, a first medium access control (MAC) command, a CSI reporting, SR information, or a dedicated recovery request information, wherein the dedicated recovery request information is carried in physical uplink control channel (PUCCH) or a physical uplink shared channel (PUSCH). The CSI report may be periodic or semi-persistent, or a trigger state of the CSI report are associated with a second RS resource group. The new candidate beam identification may include the selection of at least one RS resource from a second RS resource group. A channel quality of the at least one RS resource from the second RS resource group may be higher than or equal to a second threshold value, wherein the metric for the channel quality is RSRP or SINR. A transmission occasion or transmission occasion group of SR or dedicated recovery request information may be associated with a cell ID, a cell group ID, or one or more RS resources from a second RS resource group. A transmission occasion or transmission occasion group of PUSCH or PUCCH, wherein the PUSCH or PUCCH may be associated with the SR or dedicated recovery request information. The PUCCH may be a periodic PUCCH or a semi-persistent PUCCH. The PUSCH may be a semi-persistent scheduling (SPS) PUSCH. The link recovery request message may include at least one of: an index of first cell, an index of cell group associated with the first cell, or an index of at least one RS resource from a second RS resource group, wherein the at least one RS resource is determined according to a new candidate beam identification. The method may further include receiving, at the first radio terminal from the second radio terminal, link recovery confirmation information. After one of the following conditions is met, the first radio terminal receives RS resource(s) in a RS resource group, or transmit UL RS resource(s) in a UL resource group: detecting link recovery confirmation information; transmitting PUSCH or PUCCH, which carries the first MAC command, the CSI reporting, the SR information, or the dedicated recovery request information; transmitting a preamble of random access; detecting an indication for new data for PUSCH, after transmitting PUSCH that carries the first MAC command, CSI reporting, SR information, or the dedicated recovery request information; or determining a beam correspondence is not supported by the first radio terminal. The RS resource group may be configured with a repetition parameter. The first MAC command may be prioritized over at least one of the following channels: a configured grant confirmation MAC control element (CE); a MAC CE for a buffer status report (BSR) with an exception included for padding; a single entry power headroom report (PHR) MAC CE or a multiple entry PHR MAC CE; data from any logical channel except data from an uplink common control channel (UL-CCCH); a MAC CE for a recommended bit rate query; or a MAC CE for a BSR included for padding. The first MAC command may be de-prioritized over at least one of the following channels: a cell radio network temporary identifier (C-RNTI) MAC CE or data from UL-CCCH; a configured grant confirmation MAC CE; or a MAC CE for BSR with exception included for padding. The link recovery request message carried by the first MAC command may be determined according to an associated SR or a dedicated recovery request information, wherein the associated SR or dedicated recovery request information is associated with a cell group or a RS resource group. The link recovery request message may include at least an index of a cell of the cell group associated with the SR or dedicated recovery request information. The link recovery request message may include at least an index of RS resource of the RS resource group associated with the SR or dedicated recovery request information. After transmitting the link recovery request message, the first radio terminal may perform one or more of: detecting PDCCH or DCI in a control resource set (CORESET) or a search space for recovery in the first cell; detecting PDCCH or DCI in a CORESET or a search space for recovery in the second cell; receiving at least a second MAC command confirming the link recovery request message; or overwriting or associating a downlink control information (DCI) codepoint, a MAC CE codepoint, or a radio resource control (RRC) parameter entry for a quasi co-location (QCL) state with the RS associated with or carried by the link recovery request message. Monitoring the dedicated CORESET or the search space for recovery in the first cell may occur a quantity of S time units after transmitting the link recovery request message, and wherein S is integer. The DCI codepoint, the MAC CE codepoint, or the RRC entry may not be configured with the QCL state. After one of the following occurs, or a quantity of K time units after one of the following occurs, PDCCH in a dedicated CORESET or search space for recovery, or PDCCH in one or more CORESETs in the first cell is monitored according to QCL assumption of a RS in the link recovery request message, and wherein K is integer: transmitting the link recovery request message; or detecting the link recovery confirmation information. S or K time units may be determined according to a numerology of a channel associated with the link recovery request message and a numerology of the channel associated with the link recovery confirmation information. The first unit of S or K time units is from a first type time unit of the first cell which is not earlier or later than a last second type unit of another channel carrying the link recovery request message. The link recovery confirmation information may include one of: PDCCH or DCI in the CORESET or search space for recovery; a downlink control information (DCI) codepoint associated with the link recovery request message; a second MAC command confirming the link recovery request message; an indication for new data for a PUSCH, which the first MAC command, CSI reporting, SR information, or dedicated recovery request information; or a hybrid automatic repeat request-acknowledgment (HARQ-ACK) message corresponding to a physical downlink shared channel (PDSCH) carrying a second MAC command confirming the link recovery request message. One or more CORESETs in the first cell may be associated with at least one common search space set or CORESET#0. After the first radio terminal transmits link recovery request message or detects link recovery confirmation information from the second radio terminal, an uplink channel including PUSCH, PUCCH, or sounding reference signal (SRS), may transmit according to at least one of the following: a spatial relation or a spatial filter is determined according to a RS associated with the link recovery request message; a target power associated with an uplink channel is the target power indicated by a specific index in a target power set, or the target power is 0; a RS of a path loss estimation associated with the uplink channel is a DL RS resource with index q_new provided by a higher layer, or RS resource associated with the link recovery request message; or a closed loop power control of the uplink channel. The spatial filter of the UL channel bay be the same as the spatial filter of reception of the RS associated with the link recovery request message. A closed loop power control of the UL channel: has a specific index, is initialized by a pump-up value associated with the random access preamble, or a pump-up value associated with the random access preamble plus another value indicated by a transmission power command in DCI, or is reset. At least one of the following conditions may be met: a beam correspondence is supported by the UE, or a partial beam correspondence is support by the UE. The specific index can be 0, a lowest index, or a highest index. The first or second MAC command may be associated with one or more SRS resource sets for beam management. A spatial relation or a spatial filter of the SRS may be determined according to the RS associated with the link recovery request message. A spatial filter of SRS may be the same spatial filter or quasi-co spatial filter(s) as the RS reception. After detecting a link recovery confirmation information, a PDCCH in one or more of the following CORESETs may be monitored or prioritized to be monitored according to the QCL as RS q_new: one or more CORESETs, if only one active TCI state is supported by the first radio terminal; one or more CORESETs with common search space, if only one active TCI state is supported by the first radio terminal; or CORESET#0. After detecting a link recovery confirmation information, a PDCCH in the following CORESETs may be monitored or prioritized to be monitored according to the QCL as RS q_new: CORESETs with lowest or highest X–N or X–N+1 CORESET ID or CORESETs associated with lowest or highest N or N–1 active QCL state IDs, if N>1 active QCL states is supported by UE, where X is the number of CORESETs. The CORESETs may exclude the CORESET for recovery or CORESET#0. When CORESET#0 or CORESET with a common search space is in the bandwidth part (BWP) of the first cell, then synchronization signal blocks may be configured for new candidate beam identification or CSI-RS cannot be configured for new candidate beam identification. When the CORESET#0 or CORESET with a common search space is in the BWP of the first cell, a CSI-RS resource, wherein a reference or source RS of QCL state associated with the CSI-RS resource is one SSB, may be configured for candidate beam identification. The CORESET may be in the same cell or BWP as a PRACH transmission for recovery or the beam failure determination. The RS may be a downlink RS. The link recovery request message or the dedicated recovery request information may be jointly coded with SR information or carried by SR signaling. A channel quality of the at least one RS resource from the one second RS resource group may be less than or equal to a third threshold value, wherein the metric for the channel quality is BER, or BLER. The UL RS resource(s) may be configured for beam management. The DCI in the CORESET or search space for recovery is scrambled by C-RNTI or modulation and coding scheme (MCS) C-RNTI. The first cell is the same cell as the second cell. The first cell may be the different cell from the second cell. The first condition may include at least that a channel quality of the at least one RS resource from the second RS resource group is higher than or equal to a second threshold value, and wherein the metric for the channel quality is RSRP or SINR. The first condition may include at least that a channel quality of the at least one RS resource from the second RS resource group is less than or equal to a third threshold value, wherein the metric for the channel quality is BER or BLER. After one of the following conditions is met, the first radio terminal may receive RS resource(s) in a RS resource group, or transmit UL RS resource(s) in a UL resource group: detecting link recovery confirmation information; transmitting PUSCH or PUCCH, which carries a first MAC command, a CSI reporting, a SR information, or a dedicated recovery request information; transmitting a preamble of random access; detecting an indication for new data for PUSCH, after transmitting PUSCH that carries the first MAC command, the CSI reporting, the SR information, or the dedicated recovery request information; or determining a beam correspondence is not supported by the first radio terminal. The first or second MAC command may activate one or more SRS resource sets for beam management.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communications method, comprising:
   receiving, by a first radio terminal, one or more first reference signal (RS) resources from a base station to acquire one or more radio link qualities according to the one or more first RS resources; and
   transmitting, as part of a recovery request procedure, from the first radio terminal to the base station, a link recovery request message that includes an index of a first cell and an index of at least one RS resource from an RS resource group, in a case that a number of beam failure instances determined according to the one or more radio link qualities is equal to or greater than a first threshold value and a channel quality of the at least one RS resource selected from the RS resource group is higher than or equal to a second threshold value,
   wherein the at least one RS resource is determined according to a new candidate beam identification.

2. The wireless communication method of claim 1, wherein the recovery request procedure includes: a new candidate beam identification that includes at least one RS resource selected from an RS resource group; or a multiplexing and assembly procedure.

3. The wireless communication method of claim 1, further comprising receiving, at the first radio terminal from the base station, link recovery confirmation information.

4. The wireless communication method of claim 1, wherein the link recovery request message is signaled by one of:
   a first medium access control (MAC) command; or
   a dedicated recovery request information, wherein the dedicated recovery request information is carried in physical uplink control channel (PUCCH).

5. The wireless communication method of claim 4,
   wherein the first MAC command is prioritized over a plurality of channels including:
      a medium access control (MAC) control element (CE) for a buffer status report (BSR) with an exception included for padding;
      a single entry power headroom report (PHR) MAC CE or a multiple entry PHR MAC CE;
      data from any logical channel except data from an uplink common control channel (UL-CCCH);
      a MAC CE for a recommended bit rate query; and
      a MAC CE for a BSR included for padding, and
   wherein the first MAC command is de-prioritized over a cell radio network temporary identifier (C-RNTI) MAC CE or data from UL-CCCH.

6. The wireless communication method of claim 1, further comprising:
   after transmitting the link recovery request message, the first radio terminal transmits a physical uplink control channel (PUCCH) according to:
   a spatial filter determined according to a reference signal (RS) associated with the link recovery request message;
   an RS of a path loss estimation associated with the PUCCH being a downlink (DL) RS resource with an index that is associated with a candidate beam and provided by a higher layer; and
   a closed loop power control of the PUCCH,
   wherein the spatial filter of the PUCCH is the same as the spatial filter of reception of the RS associated with the link recovery request message, and
   wherein the closed loop power control of the PUCCH has a specific index that is set to zero.

7. A wireless communications method, comprising:
   transmitting, by a base station, to a first radio terminal, one or more first reference signal (RS) resources for acquiring one or more radio link qualities; and
   receiving, as part of a recovery request procedure, by the base station, from the first radio terminal, a link recovery request message that includes an index of a first cell and an index of at least one RS resource from an RS resource group, in a case that a number of beam failure instances according to the one or more radio link qualities is equal to or greater than a first threshold value and a channel quality of the at least one RS resource selected from the RS resource group is higher than or equal to a second threshold value, wherein metric for the channel quality is a reference signal received power (RSRP),
   wherein the at least one RS resource is determined according to a new candidate beam identification.

8. The wireless communication method of claim 7, wherein the recovery request procedure includes: a new candidate beam identification that includes at least one RS resource selected from an RS resource group; or a multiplexing and assembly procedure.

9. The wireless communication method of claim 7, further comprising transmitting, by the base station, to the first radio terminal, link recovery confirmation information.

10. The wireless communication method of claim 7, wherein the link recovery request message is signaled by one of:
   a first medium access control (MAC) command; or
   a dedicated recovery request information, wherein the dedicated recovery request information is carried in physical uplink control channel (PUCCH).

11. The wireless communication method of claim 10,
   wherein the first MAC command is prioritized over a plurality of channels including:
      a medium access control (MAC) control element (CE) for a buffer status report (BSR) with an exception included for padding;
      a single entry power headroom report (PHR) MAC CE or a multiple entry PHR MAC CE;
      data from any logical channel except data from an uplink common control channel (UL-CCCH);
      a MAC CE for a recommended bit rate query; and
      a MAC CE for a BSR included for padding, and
   wherein the first MAC command is de-prioritized over a cell radio network temporary identifier (C-RNTI) MAC CE or data from UL-CCCH.

12. The wireless communication method of claim 7, further comprising:
   after receiving the link recovery request message, the base station receives a physical uplink control channel (PUCCH) from the first radio terminal according to:
   a spatial filter determined according to a reference signal (RS) associated with the link recovery request message;
   an RS of a path loss estimation associated with the PUCCH being is a downlink (DL) RS resource with an index that is associated with a candidate beam and provided by a higher layer; and
   a closed loop power control of the PUCCH,
   wherein the spatial filter of the PUCCH is the same as the spatial filter of reception of the RS associated with the link recovery request message, and
   wherein the closed loop power control of the PUCCH has a specific index that is set to zero.

13. A first radio terminal, comprising:
   a processor configured to implement a method, comprising:
   receiving, by the first radio terminal, one or more first reference signal (RS) resources from a base station to acquire one or more radio link qualities according to the one or more first RS resources; and
   transmitting, as part of a recovery request procedure, from the first radio terminal to the base station, a link recovery request message that includes an index of a first cell and an index of at least one RS resource from an RS resource group, in a case that a number of beam failure instances determined a number of beam failure instances according to the one or more radio link qualities is equal to or greater than a first threshold value and a channel quality of the at least one RS resource selected from the RS resource group is higher than or equal to a second threshold value, wherein metric for the channel quality is a reference signal received power (RSRP),
   wherein the at least one RS resource is determined according to a new candidate beam identification.

14. The first radio terminal of claim 13, wherein the recovery request procedure includes: a new candidate beam identification that includes at least one RS resource selected from an RS resource group; or a multiplexing and assembly procedure.

15. The first radio terminal of claim 13, wherein the processor is further configured to receive, at the first radio terminal from the base station, link recovery confirmation information.

16. The first radio terminal of claim 13, wherein the link recovery request message is signaled by one of:
   a first medium access control (MAC) command; or
   a dedicated recovery request information, wherein the dedicated recovery request information is carried in physical uplink control channel (PUCCH).

17. The first radio terminal of claim 16,
   wherein the first MAC command is prioritized over a plurality of channels including:
      a medium access control (MAC) control element (CE) for a buffer status report (BSR) with an exception included for padding;
      a single entry power headroom report (PHR) MAC CE or a multiple entry PHR MAC CE;
      data from any logical channel except data from an uplink common control channel (UL-CCCH);
      a MAC CE for a recommended bit rate query; and
      a MAC CE for a BSR included for padding, and
   wherein the first MAC command is de-prioritized over a cell radio network temporary identifier (C-RNTI) MAC CE or data from UL-CCCH.

18. A base station, comprising:

a processor configured to implement a method, comprising:

transmitting, by the base station, to a first radio terminal, one or more first reference signal (RS) resources for acquiring one or more radio link qualities; and receiving, as part of a recovery request procedure, by the base station, from the first radio terminal, a link recovery request message that includes an index of a first cell and an index of at least one RS resource from an RS resource group, in a case that a number of beam failure instances according to the one or more radio link qualities is equal to or greater than a first threshold value and a channel quality of the at least one RS resource selected from the RS resource group is higher than or equal to a second threshold value, wherein metric for the channel quality is a reference signal received power (RSRP), wherein the at least one RS resource is determined according to a new candidate beam identification.

19. The base station of claim 18, wherein the recovery request procedure includes: a new candidate beam identification that includes at least one RS resource selected from an RS resource group; or a multiplexing and assembly procedure.

20. The base station of claim 18, wherein the processor is further configured to transmit, at the base station, to the first radio terminal, link recovery confirmation information.

21. The base station of claim 18, wherein the link recovery request message is signaled by one of:

a first medium access control (MAC) command; or a dedicated recovery request information, wherein the dedicated recovery request information is carried in physical uplink control channel (PUCCH).

22. The base station of claim 21, wherein the first MAC command is prioritized over a plurality of channels including:

a medium access control (MAC) control element (CE) for a buffer status report (BSR) with an exception included for padding;

a single entry power headroom report (PHR) MAC CE or a multiple entry PHR MAC CE;

data from any logical channel except data from an uplink common control channel (UL-CCCH);

a MAC CE for a recommended bit rate query; and a MAC CE for a BSR included for padding, and wherein the first MAC command is de-prioritized over a cell radio network temporary identifier (C-RNTI) MAC CE or data from UL-CCCH.

* * * * *

UNITED STATES PATENT AND TRADEMARK OFFICE
CERTIFICATE OF CORRECTION

PATENT NO. : 11,785,520 B2
APPLICATION NO. : 17/370828
DATED : October 10, 2023
INVENTOR(S) : Bo Gao et al.

Page 1 of 1

It is certified that error appears in the above-identified patent and that said Letters Patent is hereby corrected as shown below:

In the Claims

In Column 20, Line 34, in Claim 1, delete "value," and insert -- value, wherein metric for the channel quality is a reference signal received power (RSRP), --.

In Column 21, Line 6, in Claim 6, delete "a reference" and insert -- the reference --.

In Column 21, Line 9, in Claim 6, delete "an" and insert -- the --.

In Column 21, Line 10, in Claim 6, delete "a candidate" and insert -- the candidate --.

In Column 22, Line 6, in Claim 12, delete "a reference" and insert -- the reference --.

In Column 22, Line 9, in Claim 12, delete "being is a" and insert -- being a --.

In Column 22, Line 9, in Claim 12, delete "an" and insert -- the --.

In Column 22, Line 10, in Claim 12, delete "a candidate" and insert -- the candidate --.

Signed and Sealed this
Ninth Day of July, 2024

Katherine Kelly Vidal
*Director of the United States Patent and Trademark Office*